United States Patent [19]

Krovina

[11] 4,276,033
[45] Jun. 30, 1981

[54] SAILING SYSTEM

[76] Inventor: Peter G. Krovina, 12860-24th Ave. South, Seattle, Wash. 98168

[21] Appl. No.: 49,790

[22] Filed: Jun. 18, 1979

[51] Int. Cl.³ .............................................. B63H 13/00
[52] U.S. Cl. ........................................ 440/8; 114/39; 114/103; 114/90; 416/132 B
[58] Field of Search ............... 115/3; 114/39, 90, 102, 114/103, 104, 105; 416/132 B; 440/8

[56] References Cited

U.S. PATENT DOCUMENTS

| | | | |
|---|---|---|---|
| 227,842 | 5/1880 | Rudolph | 416/132 B |
| 1,407,373 | 2/1922 | Brymer | 416/132 B |
| 1,508,847 | 9/1924 | Maki | 115/3 |
| 2,261,434 | 11/1941 | Dorr | 115/3 |
| 2,408,412 | 10/1948 | Dobbins | 115/3 |
| 2,677,344 | 5/1954 | Annis | 115/3 |
| 3,913,516 | 10/1975 | Garcia | 115/31 |
| 3,964,426 | 6/1976 | Lindsey | 115/3 |

FOREIGN PATENT DOCUMENTS

| | | | |
|---|---|---|---|
| 2642570 | 3/1978 | Fed. Rep. of Germany | 416/132 B |
| 1481699 | 8/1977 | United Kingdom | 115/3 |

*Primary Examiner*—Trygve M. Blix
*Assistant Examiner*—D. W. Keen
*Attorney, Agent, or Firm*—Graybeal & Uhlir

[57] ABSTRACT

A sail mounting frame extends upwardly from the hull of a boat and is constructed of a lower section and an upper section which rotate relative to each other about a first axis of rotation which extends generally vertically upwardly with respect to the hull of the boat. An overhung axle is rotatably journaled to the mounting frame upper section for rotation about a second axis corresponding to the longitudinal axis of the axle. A circular convex sail is supported by a correspondingly shaped support frame, which support frame is mounted on the free end of the axle for rotation of the sail about both the first and second axis of rotation. The sail is constructed from a plurality of triangularly shaped, flexible sail segments which are selectively adjustable relative to the sail support frame between a closed position wherein all of the sail segments cooperate to form a substantially continuous circular convex form, and open positions wherein each of the sail segments are disposed at angles of attack relative to the wind to cause the sail segments to react to the winds to thereby rotate the sail about the second axis of rotation to power an auxiliary propulsion system for the boat.

4 Claims, 8 Drawing Figures

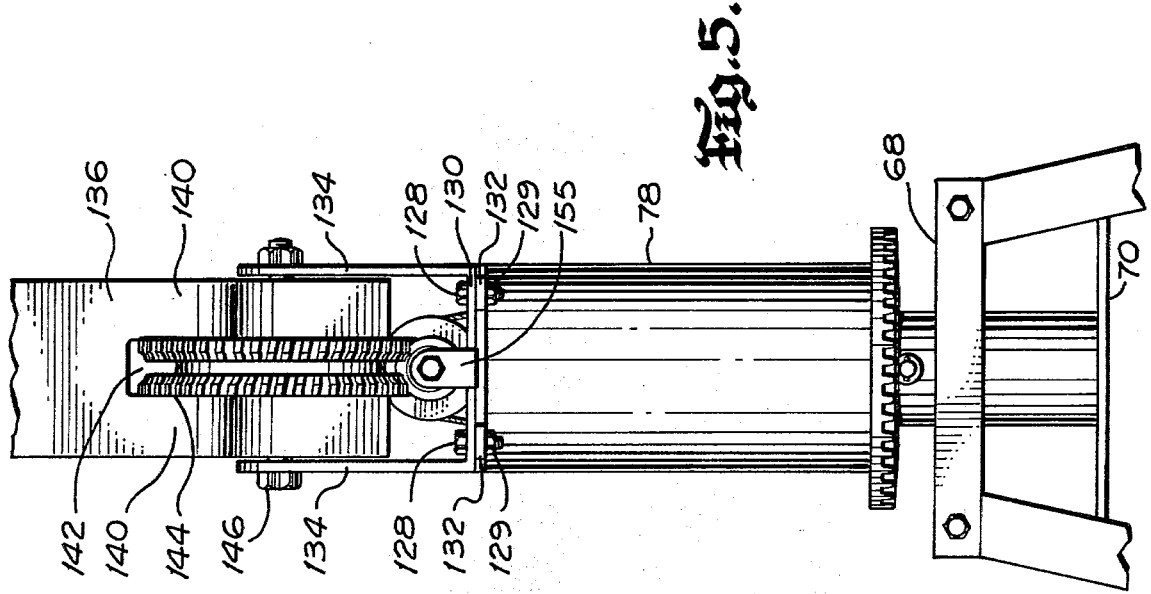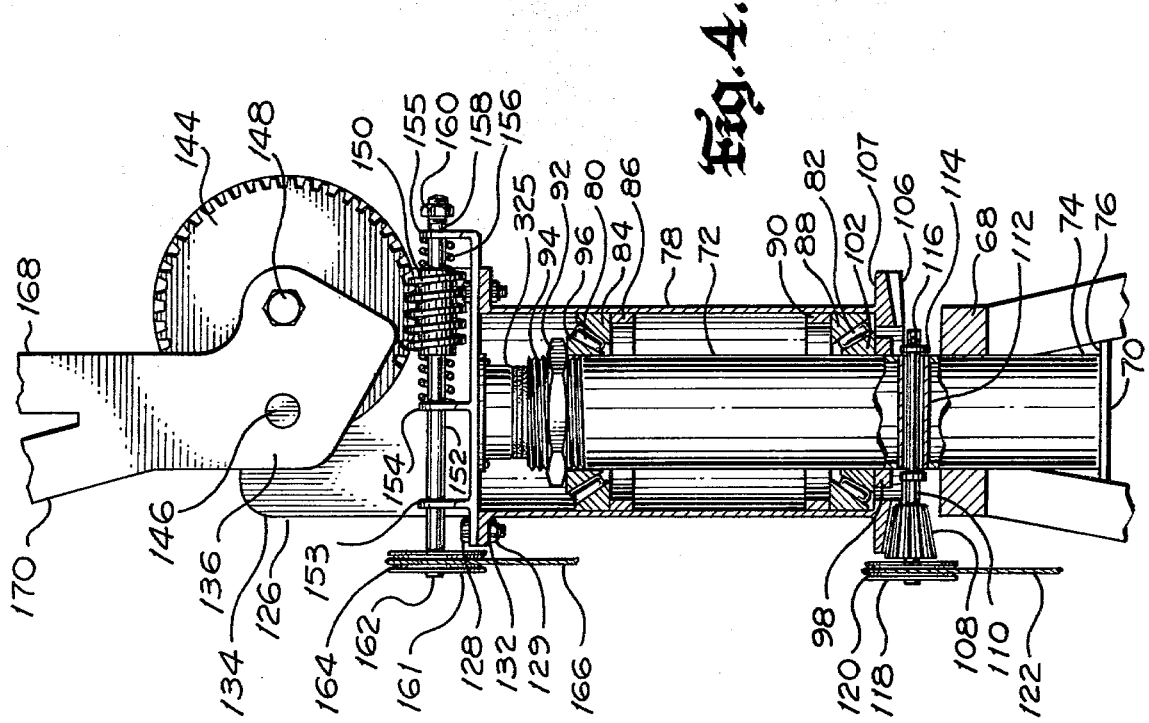

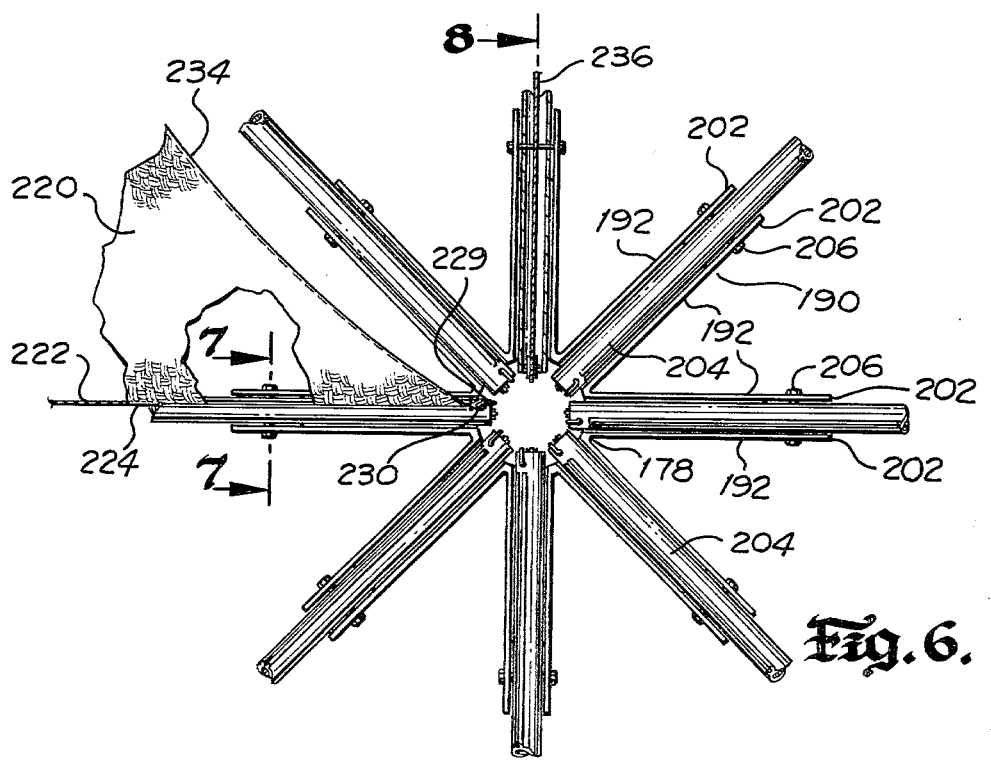
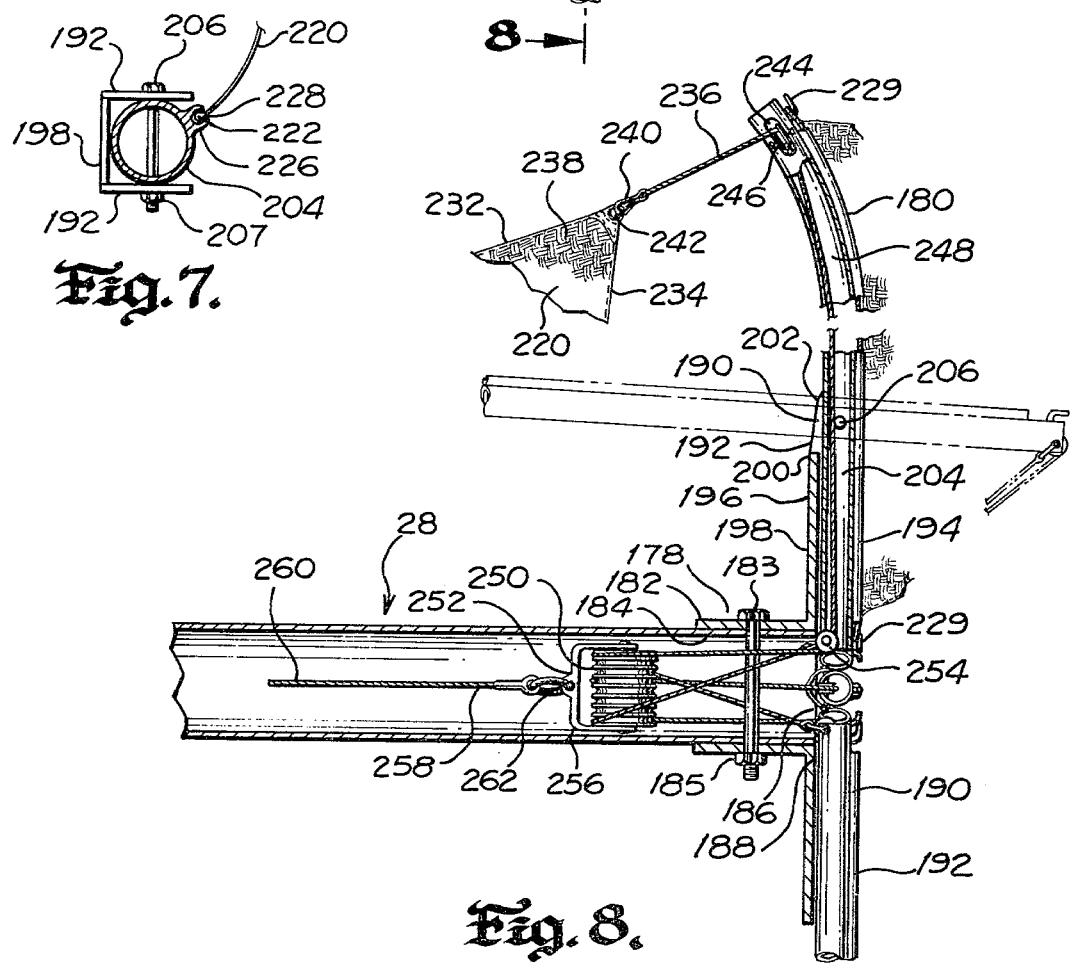

SAILING SYSTEM

BACKGROUND OF THE INVENTION

1. Field of the Invention

This invention relates to a wind driven sailing system for a boat. More particularly, it relates to a sailing system which powers a boat in the manner of a conventional sail and which also serves as an energy generating source for an auxiliary manner of propelling the boat.

2. Description of the Prior Art

Through evolution sailboats today typically are constructed with an upright elongate mast fixed to the deck or other portion of the boat hull. A forestay typically interconnects the top of the mast or masthead to the bow of the boat and a backstay extends from the masthead to the stern of the boat to thereby brace the mast in the fore and aft directions. Shrouds interconnect the masthead with the hull on each side of the boat to brace the mast in the transverse directions. The mast serves to support a triangularly shaped main sail, with the forward edge of the main sail mounted along the height of the mast to lie closely adjacent the rear or trailing side of the mast. A generally horizontally disposed, rearwardly extending boom is pivotally mounted on a lower portion of the mast to swing about the mast. The boom is adapted to be connected to the main sail along the bottom edge thereof and serves to vary the angle of the sail relative to the hull of the boat as the boom is selectively pivoted about the mast.

The main sail, for instance when the boat is on a reaching course, reacts with the wind to propel the boat through the water. To achieve maximum cruising speed, the sail is pivoted about the length of the main sail in response to the course of the boat and the direction of the wind. If the boat is on a reaching course heading diagonally into the wind, for instance on a port reach, the trailing edge of the sail is permitted to extend rearwardly from the mast towards the starboard side of the boat to thereby produce an airfoil shape. The sail divides the wind moving past it into twin currents of air which move at unequal velocities due to the sail's air foil shape. Because the air traveling along the leeward side of the sail has a further distance to travel then the air moving along the windward side of the sail, the air at the leeward side of the sail must move faster in order to reach the sail's trailing edge at the same time as the wind traveling along the windward side of the sail. It is a well-known law of physics that as a fluid accelerates it exerts less pressure on the surfaces which it flows past. Thus, the air pressure on the leeward side of the sail is relatively less than the pressure on the windward side of the sail, thereby producing a continuum of individual force components acting towards the leeward of the sail in a direction normal to the surface of the sail. The totality of all of the individual forces acting on the sail produces a lateral or heating force component acting laterally of the boat tending to push the boat sideways and a thrust force component acting along the length of the boat tending to push the boat forwardly and thus permitting the boat to travel diagonally into the wind. Thus, by steering a zig-zagged pattern, it is possible for a sailboat to actually reach an upwind destination.

When sailing laterally of the direction of the wind, with the wind blowing from the port side over the beam, the sail is opened up further than when sailing into the wind so that the trailing edge of the sail actually extends laterally sideways beyond the starboard side of the boat. The reaction between the wind and the sail is essentially the same as that described above when steering a course diagonally into the wind; however, when sailing laterally of the wind a larger forward propelling, thrust force is produced while a smaller transverse or heeling force is produced.

When running, or sailing in the direction of the wind, the sail is permitted to extend essentially perpendicularly to the length of the boat so that the boat's forward movement comes simply from the wind pushing against the sail.

However, no matter what course one desres to sail relative to the wind, movement of the boat is always dependent on the existence of a wind. Without any wind a sail simply cannot provide any propulsion force. Furthermore, a sailboat that is powered only by sails is difficult to maneuver in close quarters. Thus, when entering and leaving crowded areas, such as a marina, an auxiliary power source, such as an outboard motor, is commonly employed. Moreover, even if the sails of a boat are rigged for foul weather, the boat propelled only by sails is difficult to handle during a storm when the seas are rough and the wind is blowing at a high speed.

Thus, most boats cannot rely solely on sails as their only source of propulsion. Rather, an auxiliary power source, such as an inboard or outboard motor powered by gasoline, diesel or an electric battery, is usually required to augment the sail. But with the escalating price of petroleum fuels, the expense of operating even an auxiliary gasoline or diesel engine for a sailboat, has been increasing dramatically. Furthermore, because of the inherent inflammability of petroleum fuels, boating regulations only permit a limited quantity of fuel to be carried on a boat unless adequate structure and ventilation regulations are met. It is usually economically impractical to build many smaller size sailboats in such a manner to meet these regulations; thus, the limited amount of fuel which these boats are allowed to carry seriously hampers their maximum cruising range.

Rather than utilizing a conventional sail, in another type of wind powered boat, a windmill is used to propel the boat. In one such type of boat the rotating propeller of the windmill is mechanically coupled to drive a conventional ship's screw. Examples of this type of boat are disclosed by Dobbins U.S. Pat. No. 2,408,412; and by Lindsey U.S. Pat. No. 3,964,426.

Another type of windmill boat is disclosed by Dore U.S. Pat. No. 2,261,434 wherein a windmill has been utilized to essentially replace the gasoline engine of an outboard motor. As with the two previously discussed patents, the windmill is mechanically coupled to the well-known propeller of the outboard motor.

Another example of a windmill type of boat is disclosed by Maki et al. U.S. Pat. No. 1,506,847, wherein the propeller of a windmill is mechanically coupled to a pair of paddles which extend downwardly into the water at the rear of the boat. The paddles pivot back and forth about their upper ends, which upper ends are pivotally connected to the boat to thereby push the boat through the water. The paddles are designed to also alternatively open and close so that when the paddle is pivoting rearwardly, the plane of the paddle extends transversely of the length of the boat to create a forward propulsion force. However, when the paddle is pivoting forwardly toward the boat, the paddle lies in a plane longitudinally of the boat thereby causing very little drag in the water.

As discussed above with respect to boats powered by a conventional sail, windmill powered boats also require the existence of a wind for propulsion. Thus, when no wind is blowing, boats utilizing windmills have no source of propulsion.

SUMMARY OF THE INVENTION

The present invention relates to a novel sailing system for a boat utilizing a sail in the manner of a conventional sail and also utilizing the same sail to energize a secondary propulsion source which serves as an auxiliary manner of propelling the boat. In basic form, the sailing system includes a mounting frame which extends upwardly from the hull of the boat. The mounting frame includes a lower section mounted on the boat and an upper section which extends upwardly from said lower section is rotatably interconnected to the upper mounting frame section to rotate about a first axis of rotation which extends generally vertically upwardly with respect to the hull of the boat.

A hollow, overhung, elongate axle has one of its ends journaled to the mounting frame upper section for rotation about a second axis of rotation corresponding to the longitudinal axis of the axle. The center hub of a collapsible sail support frame is mounted on the free end of the axle opposite the mounting frame upper section. The sail support frame also includes a plurality of hollow, radial ribs radiating outwardly about the circumference of said hub. The inward end of each radial rib is pivotally attached to the hub to permit each radial rib to pivot between a collapsed position wherein each of the ribs lies longitudinally along the length of the axle, and an erect position wherein each of the radial ribs radiate outwardly from the hub at an angle substantially perpendicular to the length of the axle. A retention line extends between the axle and the end of each of the radial ribs to permit each of the radial ribs to pivot about the hub between the collapsed position and the erect position while preventing each of the ribs to pivot beyond the erect position.

A circular convex or umbrella-shaped sail, which is constructed about a center corresponding to the center of the hub, is supported by the sail support frame for rotation about the first axis of rotation and about the length of the axle. The sail is constructed from a plurality of triangularly shaped, flexible sail segments which radiate outwardly from the hub and are positioned about the sail support frame so that one each of the segments is mounted on a radial rib to be disposed between two adjacent radial ribs.

The orientation of each sail segment relative to the sail support frame is adjustable between a closed position wherein all of the sail segments cooperate to form a substantially continuous circular convex form, and open positions wherein the leading edge of each sail segment is disposed forwardly of the support frame at an angle of attack relative to the wind to enable each sail segment to react to the wind to thereby cause the sail to rotate about the length of the axle. More specifically, each of the triangularly shaped sail segments has a fixed side edge connected to the length of one rib, an outer edge corresponding to the circumference of the sail and an open side edge which is disposed closely along the fixed side edge of an adjacent sail segment when the sail is in closed position, and disposed forwardly of the fixed side edge of the adjacent sail segment when the sail is in open position.

To shift the sail segments between the open and closed sail positions, a draw line is connected to the corner of each of the sail segments defined by the sail segment outer edge and the sail segment open side edge. The draw line is receivable through an opening in the free end portion of the rib which supports the closed edge of the next adjacent sail segment and then the line extends through the radial rib to the hub and then extends into the hollow axle. A torque amplifying pulley, which is housed within the axle, is attached to the draw line of each sail segment. The pulley is movable longitudinally within the axle to draw each draw line more taut thereby disposing each sail segment in closed position. Simultaneously, the draw line applies a compressive load to each of the radial ribs to maintain said ribs in erect position. The pulley is also movable in the opposite direction along the length of the axle to reduce the tension in each of the draw lines to thereby permit each sail segment to assume an open position wherein the open side edge of each sail segment extends forwardly of the sail support frame wherein the sail segment is disposed at an angle of attach relative to the wind.

It is a principal object of the present invention to provide a wind-driven sailing system to propel a boat in the manner of a conventional sail and also to power an auxiliary propulsion system.

It is another object of the present invention to provide a retractable, umbrella-shaped wind-driven sail which can serve as a conventional sail and also which rotates about a center to generate electrical energy for an auxiliary propulsion system.

It is a further object of the present invention to provide a wind-driven sailing system in which electrical power generated by the sail is stored in batteries that also serve as at least a portion of the ballast of the boat.

It is also an object of the present invention to provide a wind-driven sailing system which eliminates the need for an auxiliary propulsion system which requires the use of petroleum fuel thereby reducing the cost of maintaining the operating the auxiliary propulsion system.

One more object of the present invention is to provide a wind-driven sailing system which creates little if any air or water pollution.

Yet another object of the present invention is to provide a wind-driven sailing system which in operation is so quiet and virtually vibration free.

Another object of the present invention is to provide a wind-driven sailing system which is economical to operate even when there is no wind.

One further object of the present invention is to provide a sailing system having a collapsible sail which is mounted on a retractable frame to thereby reduce the vertical center of gravity of the boat when the sail is not in use.

It is yet another object of the present invention to provide a wind-driven sailing system which permits the boat to be cruised for long ranges especially in less than ideal wind conditions.

Still a further object of the present invention is to satisfy the electrical power needs of the boat including the power to operate the running lights, cabin lights, cabin space heaters and cooking stove, all without the use of wood or petroleum fuels.

BRIEF DESCRIPTION OF THE DRAWINGS

FIG. 4 is a fragmentary, enlarged elevational view of a typical embodiment of the present invention specifically illustrating the manner in which the upper and lower mounting frame sections are interconnected, with portions thereof shown in cross section;

FIG. 5 is a fragmentary enlarged front elevational view of the typical embodiment of the present invention illustrated in FIG. 4;

FIG. 6 is an enlarged, fragmentary view of a portion of the sail support frame illustrated in FIG. 2, taken substantially along lines 6—6 thereof;

FIG. 7 is an enlarged cross-sectional view of the sail support frame shown in FIG. 6 taken substantially along lines 7—7 thereof; and, FIG. 8 is an enlarged, partial cross-sectional view of the sail support frame illustrated in FIG. 6 taken substantially along lines 8—8 thereof.

DETAILED DESCRIPTION

Figure 1:
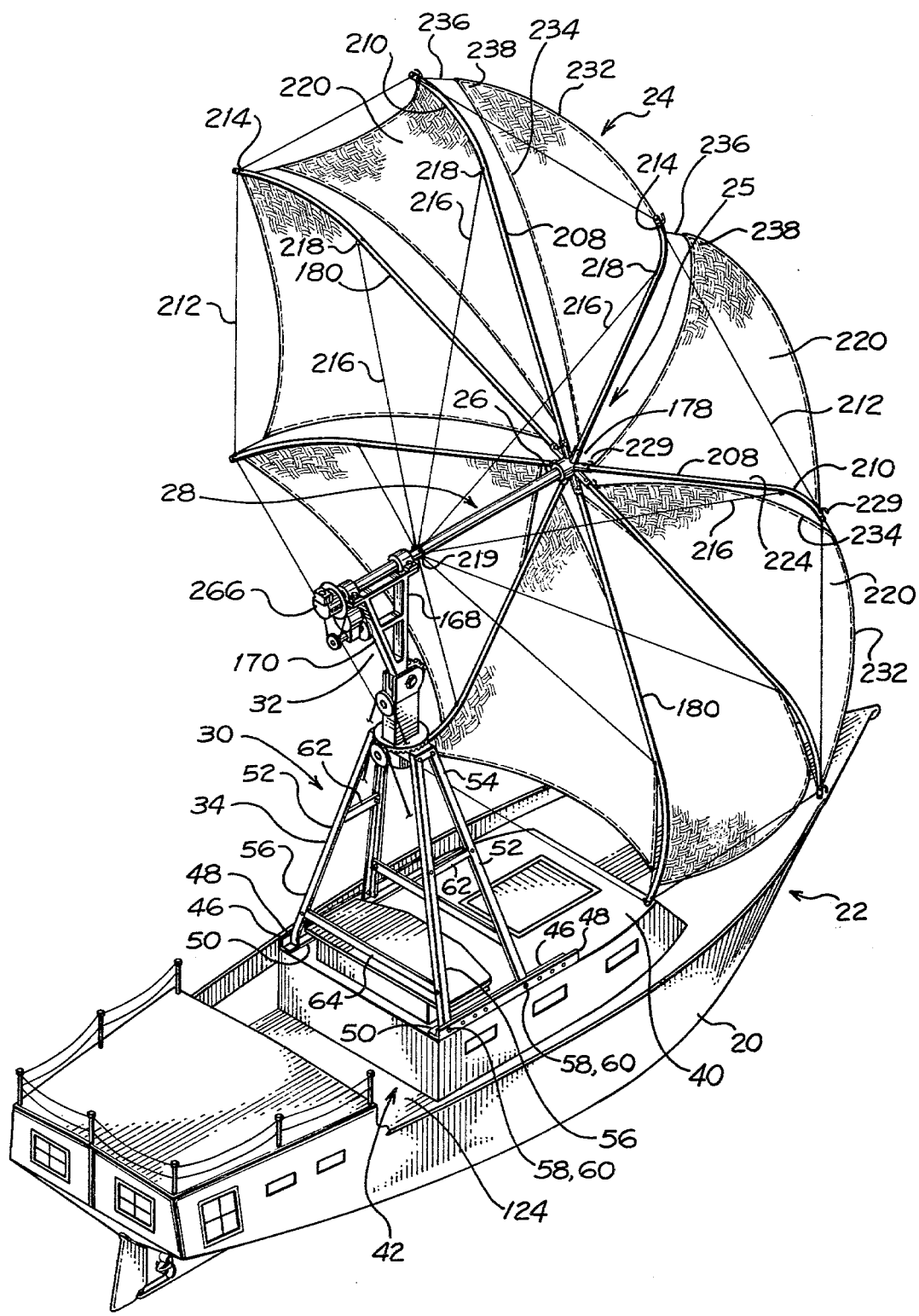
FIG. 1 is an isometric view of a typical embodiment of the present invention shown with the mounting frame in erect position and the sail in partially open position.
Figure 2:
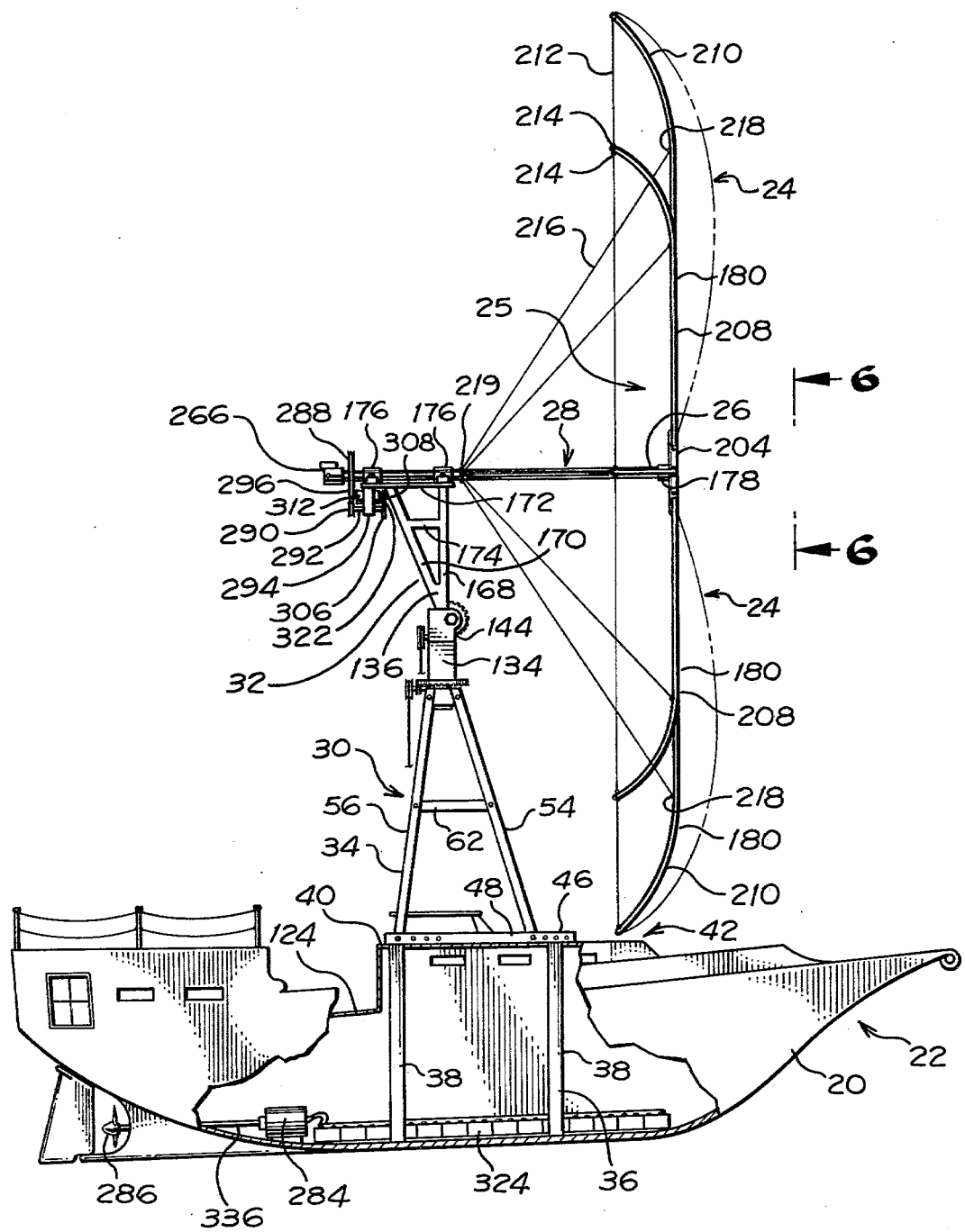
FIG. 2 is a side elevational view of an embodiment of the present invention with portions of the hull of the boat shown broken away.

Referring initially to FIGS. 1 and 2, a wind-driven sailing system constructed according to the present invention is shown mounted on the hull 20 of a boat 22. The sailing system includes a circular convex shaped sail 24 which is supported on a like shaped frame 25 to function in the manner of a conventional sail. Sail support frame 25 is in turn mounted on the free end 26 of overhung axle 28. Axle 28 is rotatably journaled to the upper end of the mounting frame 30 for rotation of axle 28 and sail 24 relative to hull 20 about an axis extending generally vertically to said hull 20.

Figure 3:
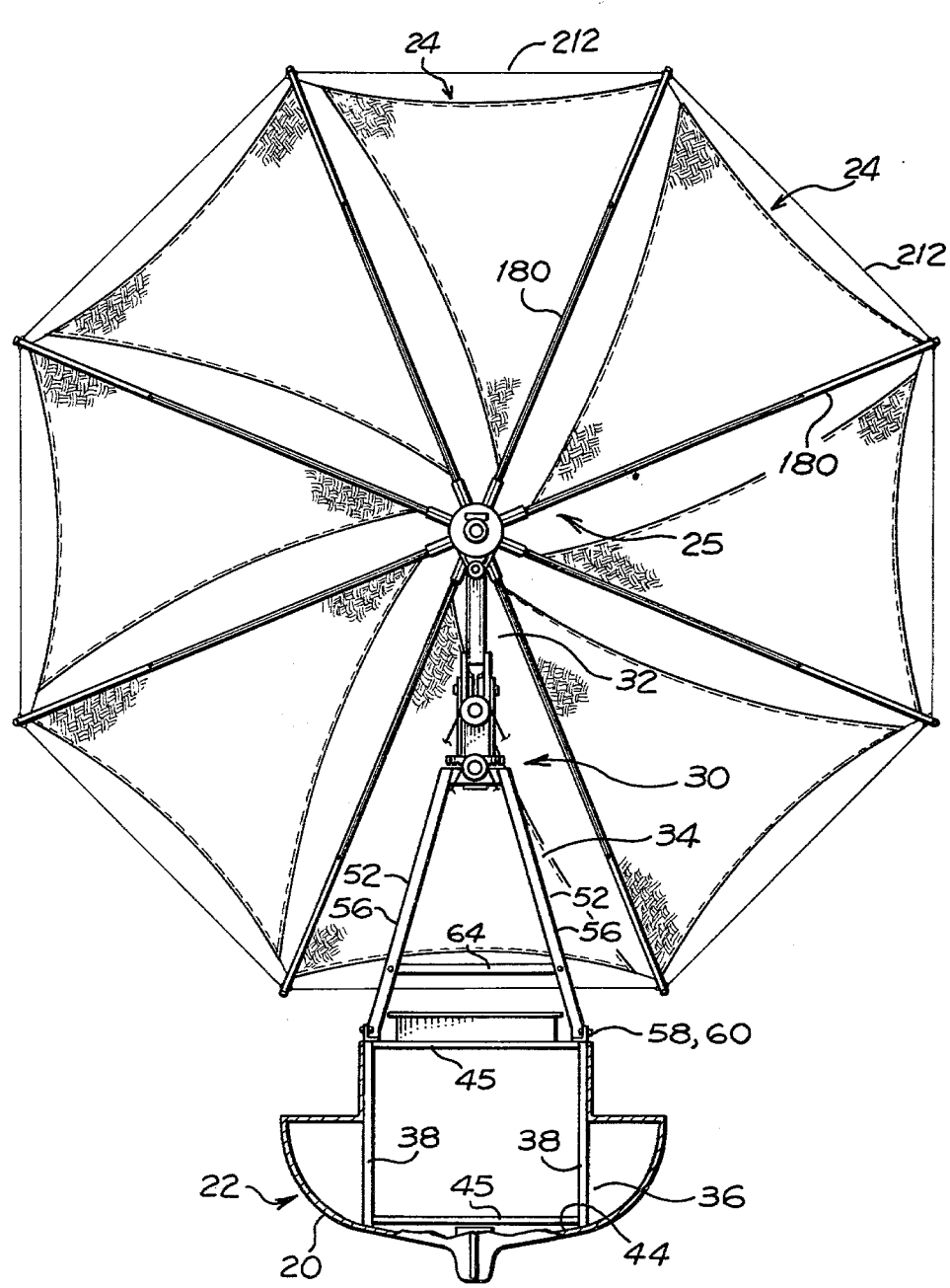
FIG. 3 is a rear elevational view of a typical embodiment of the present invention.

Now referring specifically to FIGS. 1-3, mounting frame 30 is illustrated as constructed of a subframe 36 having columns 38 which extend vertically downwardly from roof 40 of cockpit 42 to the level of floor 44 of the hull 20. Preferably columns 38 are anchored to floor 44 to thereby provide a rigid interconnection between mounting frame 30 and hull 20. Horizontal cross braces 45 interconnect 38 to enhance the structural integrity of subframe 36. It is to be understood that if a boat has sufficient structural integrity, the use of subframe 36 may not be required, especially if mounting frame 30 is anchored to the deck of a boat rather than to the roof 40 of cockpit 42 as illustrated in FIGS. 1-3.

Subframe 36 also includes a pair of parallel, elongate mounting bars 46. Mounting bars 46 extend longitudinally of the length of hull 20 and are laterally spaced apart to interconnect the upper ends of the pair of columns 38 disposed on each side of hull 20. Furthermore, each mounting bar 46 is L-shaped in cross section, having an upstanding or vertical leg 48 and a horizontal leg 50 directed inwardly toward the longitudinal centerline of hull 20. As previously discussed, if roof 40 has sufficient structural integrity, the horizontal leg 50 of each mounting bar 46 can be bolted or otherwise anchored directly to roof 40.

Again referring specifically to FIGS. 1-3, lower section 34 of mounting frame 30 is constructed of a pair of laterally spaced apart leg structures 52 each having a forward leg 54 and a rearward leg 56. The lower end portion of each leg 54 and 56 is fastened to vertical leg 48 of a corresponding mounting bar 46 by the use of conventional fasteners such as capscrew 58 which extends through a selected opening in vertical leg 48 of mounting bar 46 to engage with nut 60. A plurality of openings are provided in each vertical leg 48 so that mounting frame 30 can be selectively positioned fore and aft along to thereby permit the propelling force imparted on boat 22 to be optimumly located along the length of said boat in response to factors such as the particular load being carried by the boat. The forward leg 54 and the rearward leg 56 of each leg structure 52 both extend upwardly from mounting bar 46 and inwardly towards each other so that the longitudinal spacing separating the upper ends of forward leg 54 and rearward leg 56 of each leg structure 52 is substantially less than the longitudinal distance separating the lower ends of such legs. A horizontally disposed brace 62 interconnects the forward leg 54 and the rearward leg 56 of each leg structure 52 at an elevation intermediate the upper and lower ends of said legs 54 and 56.

Furthermore, as best shown in FIGS. 1 and 3, both leg structures 52 extend laterally towards each other as they rise upwardly from their associated mounting bars 46 so that the lateral distance separating leg structures 52 is less at the upper end of said leg structure 52 than at the lower end of said leg structures 52. A pair of transverse, horizontally disposed lower braces 64 interconnect the lower end portions of forward legs 54 and rearward legs 56. Lower braces 64 serve to increase the structural integrity and strength of mounting frame lower section 32.

The upper end portions of leg structures 52 as best shown in FIGS. 4 and 5 are rigidly interconnected to a pair of horizontally disposed, vertically spaced apart plates 68 and 70 by means of welding or the like. Upstanding circular shaft or post 72 has its lower end portion 74 fixedly abutted against the upper surface 76 of lower plate 70. From lower plate 70, post 72 extends through an opening centrally located within upper plate 68 to rise to an elevation substantially above said upper plate 68. Preferably post 72 is also rigidly connected to upper plate 68, for instance, by welding. Also, preferably post 72 is cylindrical in shape rather than in the shape of a circular solid to thereby reduce the weight of said post 72.

Again referring to FIGS. 4 and 5, a cylindrically shaped sleeve 78 encircles post 72 and is antifrictionally mounted to said post 72 by upper and lower radial thrust bearings 80 and 82, respectively. The outer race 84 of upper bearing 80 bears downwardly against ring 86 which is affixed to the inside diameter of circular sleeve 78 while the outer race 88 of lower bearing 82 bears upwardly against ring 90 which is also affixed to the inside diameter of circular sleeve 78. The inner race 102 of lower bearing 82 bears downwardly against collar 98 which is fixedly engaged over post 72. Upper bearing 80 and lower bearings 82 are preloaded by upper nut 92 which engages over threads 94 provided in the upper end portion of post 72 to thereby abut downwardly against inner race 96 of upper bearing 80. It can be appreciated that upper and lower bearings 80 and 82 permit sleeve 78 to antifrictionally pivot about posts 72 while carrying the radial and thrust loads transmitted between said sleeve 78 and post 72.

Still referring to FIGS. 4 and 5, sleeve 78 is rotated about post 72 through the use of downwardly facing bevel gear 106 which has its rear or upwardly directed back surface 107 fixedly attached to the bottom edge of sleeve 78, for instance, by welding to thereby be concentric with the vertical axis about which sleeve 78 rotates. As best shown in FIG. 4, bevel gear 106 is larger in diameter than sleeve 78. A pinion 108 is meshed with bevel gear 106, which pinion 108 is mounted on the overhanding portion of horizontally disposed pinion shaft 110. Pinion shaft 110 is rotatably received within sleeve 112, which sleeve extends through diametrically opposed vertical holes provided in post 72. Sleeve 112 is securely attached to post 72 by any convenient manner to extend slightly outwardly beyond the diameter of said post 72. Adjacent each end of sleeve 112 is a washer 114 and then a cotter key 116 receivable through holes cross-drilled in pinion shaft 110. Pinion 108 is secured to shaft 110 by well-known means, such as by keying, to thereby prevent any relative movement between said pinion 108 and said shaft 110. A rope pulley 118 is rotatably affixed to the portion of pinion shaft 110 which extends radially outwardly beyond of pinion 108. Circumferential pulley groove 120 is sized to receive rope 122 therein, which rope extends downwardly from pulley 118 to an elevation near deck 124 to thereby be conveniently pulled by a crew member. Pulling on rope 122 will cause pulley 118 and pinion 108 to rotate about the length of pinion shaft 110 which in turn will cause bevel gear 106 and sleeve 78 to rotate about upstanding post 72.

The upper end of sleeve 78 as shown in FIGS. 4 and 5, is capped by a generally U-shaped base member 126 which is detachably connected to said sleeve 78 through the use of fasteners, such as capscrews 128 and nuts 129. Capscrews 128 extend through holes provided in rectangularly shaped plate portion 130 of base member 126 through aligned holes provided in lugs 132 that extend radially outwardly from the circumference of sleeve 78. Base member 126 is constructed to be removable from sleeve 78 to thereby provide access to upper nut 92 and upper bearing 80.

Base member 126 also includes a pair of rectangularly shaped upright walls 134, which walls are disposed in spaced parallel relationship to closely receive between them the foot portion 136 of upper frame section 32. Foot portion 136 is bifurcated into two spaced apart halves 140. Halves 140 define a downwardly opening slot 142, in which slot 142 a vertically disposed worm gear 144 is closely received. Said worm gear 144 is pinned to bifurcated foot halves 140 through the use of a fastener, such as horizontally disposed pin 146 which extends through aligned openings provided in each foot half 140 and through an opening provided through the peripherey of worm gear 144. A horizontally disposed capscrew 148 extends through aligned holes provided in both upright walls 134 and in foot halves 140 and through a second hole provided through the center of worm gear 144 to permit mounting frame upper section 32 to pivot relative to base member 126 about the horizontal axis defined by capscrew 148. Capscrew 148, together with pin 146, securely mounts worm gear 144 to foot 136 without permitting any relative movement therebetween so that worm gear 144 rotates with mounting frame upper section 32.

Rotation of mounting frame upper section 32 relative to base member 126 about capscrew 148 is accomplished by rotating worm 150 which meshes with worm gear 144. Worm 150 is axled on elongate, horizontally disposed shaft 152 which extends peripendicularly to the length of both pin 146 and capscrew 148. Shaft 152 is supported for rotation about its longitudinal axis at an elevation above base member plate portion 130 by three upstanding support plates 153, 154 and 155. Shaft 152 extends through aligned vertical holes provided in said three support plates. A pair of compression springs 156 are engaged over shaft 152, with one each of said springs 156 being disposed between the one end of worm 150 and the adjacent support plates 154 or 155. Springs 156 nominally restrains worm 150 to a location approximately halfway between support plates 154 and 155 while also permitting shaft 152 to slide axially relative to support plates 154 and 155 when a shock load is imparted on mounting frame upper section 32. For instance, if a strong gust of wind blows against sail 24, mounting frame upper section 32 can pivot through a limited angle about capscrew 148 thereby causing shaft 152 to slide axially a limited distance as one of the two springs 156 is compressed. The end portion 158 of shaft 152, located adjacent worm 150, extends outwardly beyond support plate 155 a distance sufficient to permit shaft 152 to slide axially without bottoming on nut 160 which is securely affixed to said end portion 158 to prevent shaft from accidentally slidably disengaging from support plates 153, 154 and 155.

A rope sheave 161 is keyed to the free end portion 162 of shaft 152 which overhangs upright support plate 153. Circumferential groove 164 of sheave 161 is sized to receive pull rope 166 which extends downwardly from sheave 161 to wrap around another sheave (not shown) which is located at an elevation close enough to deck 124 to enable said rope 166 to be easily pulled by a crew member to thereby rotate mounting frame upper section 32 relative to mounting frame lower section 34 about horizontally disposed capscrew 148. Rather than utilizing a second rope sheave, rope sheave 161 could be replaced by a chain sheave (not shown) and rope 166 replaced by a chain (not shown) which chain would not tend to slip relative to its corresponding sheave. Alternatively, sheave 161 and rope 166 could be replaced by an electrically powered winch (not shown) which could be coupled to the free end portion 162 of shaft 152 to selectively rotate mounting frame upper section 32 about capscrew 148 to thereby tilt sail 24.

As perhaps best illustrated in FIGS. 1 and 2, mounting frame upper section 32 is generally in the shape of an inverted right triangle and is constructed with a vertical leg 168 and a diagonal leg 170 which two legs extend downwardly to intersect with each other at foot portion 136, previously described. The upper ends of vertical leg 168 and 170 are interconnected by an elongate, horizontally disposed flat plate 172 which overhangs slightly forwardly of vertical leg 168 and overhangs substantially rearwardly of diagonal leg 170. A horizontally disposed cross brace 174 interconnects vertical leg 168 and diagonal leg 170 at an elevation intermediate foot 136 and plate 172.

Again referring to FIGS. 1 and 2, axle 28 is illustrated as rotatably mounted to plate 172 through the use of a pair of radial thrust bearings 176 which are spaced along the length of plate 172 to permit axle 28 to antifrictionally rotate about its longitudinal axis. Axle 28 is illustrated in FIGS. 1 and 2 as being overhung a considerable distance forwardly of mounting frame upper section 32. Preferably axle 28 is constructed from a cylindrically shaped tubular member to thereby minimize the weight of said axle without reducing the capability of said axle to carry bending loads.

Now referring specifically to FIGS. 1, 2, 7 and 8, the typical umbrella-shaped sail support frame 25 illustrated therein is constructed basically of a central hub 178 corresponding to the center of sail 24 and a plurality of uniformly angularly spaced apart, formed radial ribs 180 radiating outwardly from said hub 178 to cooperate together to form a generally umbrella shape. Specifically, central hub 178 includes a socket member 182 which is securely engaged over the free end portion 184 of axle 28 by any convenient means, such as capscrew 183 which extends through aligned diametrically opposed openings provided in socket member 182 and axle 28 to engage with nut 185, so that the forward end 186 of axle 28 is substantially aligned with the forward end 188 of hub socket member 182. Hub 178 also includes a plurality of spoke members 190 which radiate outwardly from the forward end portion of socket member 182. Said spoke members 190 are each uniformly angularly spaced apart about the circumference of socket member 182 and disposed such that each spoke member 190 is positioned diametrically oppositely with respect to another spoke member 190. Each spoke member 190 is constructed from a pair of elongate side arms 192 which are disposed in spaced parallel relationship to each other and are aligned relative to axle 28 such that the plane defined by each side arm 192 is disposed parallel to the length of axle 28. Furthermore, each side arm 192 is disposed relative to socket member 182 such that the forward edge 194 of each side arm 192 extends forwardly of the forward end 188 of socket member 182 and such that the rearward edge 196 of each side arm 192 intersects socket 182 slightly rearwardly of the forward end 188 of said socket 182. Each spoke member 190 also includes a cross arm 198 which spans across each pair of side arms 192 to interconnect the rearward edges 196 of each pair of side arms 192 of each spoke member 190. As best shown in FIG. 11, the outer end portion 200 of each cross arm 198 terminates a distance radially inwardly of the outer end portions 202 of side arms 196.

Sail support frame 24 also includes a plurality of formed, elongate radial ribs 180 which are pivotally mounted on hub 178 to be uniformly angularly spaced apart relative to each other. Specifically, the inward end portion 204 of each radial rib 180 is closely receivable within the space separating the two side arms 192 of each spoke member 190. A fastener such as capscrew 206 extends through aligned openings provided in the outer end portions 202 of each side arm 192 and through diametrically opposed holes provided in the inner end portion 204 of each radial rib 180 to engage nut 207. Capscrew 206 permits each radial rib 180 to pivot between an erect position, shown in solid lines in FIG. 8, wherein each of said radial ribs 180 extends substantially perpendicular to the length of axle 28 and a collapsed position, shown in broken line in FIG. 8, wherein each of said radial ribs lies longitudinally alongside the length of axle 28. The cross arm 198 of each spoke member 190 abuts against the rearwardly facing side of each rib 180 to prevent the corresponding radial rib 180 from pivoting forwardly relative to hub 178 beyond the erect position wherein each of said radial ribs 180 is disposed substantially perpendicularly to the length of axle 28.

Each radial rib 180 includes a substantially straight, elongate, intermediate portion 208 extending radially outwardly from a corresponding inward end portion 204, and an arcuate outer end portion 210 which extends arcuately radially outwardly and rearwardly from its corresponding intermediate portion 208. Thus, as best illustrated in FIGS. 1 and 2, radial ribs 180 of sail support frame 25 when in erect position together define a generally umbrella-shaped form.

To enhance the rigidity of sail support frame 25, a guy line 212 is connected between the outer end portions 210 of each adjacent radial rib 180. Said guy lines 212 can be attached to rib outer end portions 210 by any convenient means such as through rings 214 affixed to each lateral side of rib outer end portion 210. Thus, guy lines 210 provide a lightweight, inexpensive method of maintaining the angular relationship between adjacent ribs 180. To further brace support frame 25, a retention line 216 is connected between axle 28 and each radial rib 180. One end of each retention line 216 is anchored to a ring 218 affixed to each rib 180 at the location generally corresponding to the intersection of rib intermediate portion 208 with rib arcuate outer end portion 210. The opposite end of each retention line 216 is anchored to a corresponding ring 219 fixed to axle 28 of a location slightly forwardly of mounting frame upper section 32. It can be appreciated that retention lines 216 permit each radial rib 180 to shift between the erect position shown in solid lines in FIGS 1-3, and 8 and the collapsed position shown in broken lines in FIGS. 2 and 8. However, retention lines 216 do not permit radial ribs 180 to pivot forwardly beyond their erect positions.

Preferably each rib 180 is constructed from a lightweight, but strong, tubular metallic material, such as aluminum, to thereby minimize the weight of sail support frame 25 without compromising the strength of radial ribs 180.

Furthermore, the typical sail support frame illustrated in FIGS. 1-3, 7 and 8 is constructed from eight radial ribs 180 which are uniformly angularly spaced about the circumference of hub 178 so that each rib 180 is diametrically opposed with respect to another rib 180. Rather than utilizing exactly eight ribs 180, a different number of ribs 180 can be used especially if sail 24 is increased or decreased in size from that illustrated in FIGS. 1-3, 7 and 8.

Sail 24, as best illustrated in FIG. 1 is composed of a plurality of individual, identical, triangularly shaped sail flaps or segments 220 radiating outwardly from hub 78, with one each of said segments 220 disposed between an adjacent pair of radial ribs 180. Sail segments 220 cooperate together to form a generally umbrella or circular convex shaped sail 24. For reasons of both strength and durability, each sail segment 220 is preferably constructed from flexible but tough cloth-like material such as those now commonly used in conventional sails.

Each sail segment 220 includes a bolt rope 222 incorporated into the trailing or closed side edge of 224 of each sail segment 220. Each sail segment 220 is attached substantially along the entire length of one radial rib 180 by threading the bolt rope 220 through bolt rope channel 226 which extends along the length of each rib 180. As best shown in FIGS. 7 and 8, bolt rope channel 226 is positioned about the circumference of rib 180 so that the opening 228 of said bolt rope channel 226 is directed generally forwardly of sail 24 and laterally towards the next adjacent radial rib 180. The length of each sail segment closed side edge 224 is approximately equal to the length of a corresponding rib 180. To prevent each sail segment 220 from becoming disengaged from bolt rope channel 226, the width of channel opening 228 is formed narrower than the diameter of bolt rope 222. To prevent sail segment closed side edge 224 from shifting longitudinally relative to rib 180, a hook 229 is provided at the inward end portion 204 and at the outer end portion 210 of each rib 180. An opening 230 is formed in each end of said segment closed edge 224 through which opening 230 a hook 229 engages to thereby prevent sail segment closed side edge 224 from moving longitudinally of its corresponding rib 180.

Each triangularly shaped sail segment 220 also includes an outer edge 232 which preferably extends along an arc corresponding to the outer circumference of a circle defined by rib outer end portions 210. Each sail segment 220 further includes an open side edge 234 of the same length as its corresponding closed side edge 224, which open side edge 234 is disposed along the closed side edge 224 of an adjacent sail segment 220.

The orientation of each sail segment 220 relative to sail support frame 25 can be selectively altered between a closed position in which all the sail segments 220 cooperate to form a generally continuous closed, circular convex form to permit sail 24 to function as a conventional sail, and variable open positions in which sail segments 220 are permitted to assume orientations askewed with umbrella-shaped support frame 25 to thus react with the wind to cause sail 4 to rotate about its center in a manner similar to a windmill to thereby power an auxiliary propulsion system for boat 22. As discussed more fully below, varying the open position of each sail segment 220 not only alters the efficiency of sail 24 when it is utilized as a conventional sail, but also by changing the angle of attack of each sail segment 220, alters the speed at which sail 24 rotates when it is used to energize the auxiliary propulsion system. More specifically, when sail 24 is in closed position, the open side edge 234 of each sail segment 220 lies closely adjacent the closed edge 224 of an adjacent sail segment 220. Corresponding when sail 24 is in an open position, open edge 234 of each sail segment 220 is disposed at various distances forwardly of the closed edge 224 of an adjacent sail segment 220, as shown in FIG. 1, to thereby permit each sail segment 220 to catch and react against the wind to thus cause sail 24 to rotate about its center.

To selectively adjust the extent to which each sail segment 220 is opened, a draw line 236 is attached to the corner 238 of sail segment 220 defined by the intersection of outer edge 232 and open side edge 234. A hook 240, affixed to the adjacent free end of draw line 236, is engaged through an opening 242 provided in sail corner 238. From each sail corner 238, a draw line 236 extends through a hole 244 provided in the outer end portion 210 of each radial rib 180 and then around a pulley 246 located within radial rib 180 at each of said radial rib outer end portions 210. As best shown in FIG. 8, from pulley 246 each draw line 236 runs through the interior 248 of each radial rib 180, out the rib inner end portion 204, into the adjacent free end 186 of axle 28, around a groove of a pulley 250 of block 252 located within axle 28 and then back outwardly through the axle free end 186 to the inner end portion 204 of a diametrically opposed radial rib 180, to which diametrically opposed radial rib 108 draw line 236 is anchored. To reduce drag and line wear, each draw line 236 rides around a pulley 254 mounted within the interior of the inner end portion 206 of each radial rib 180, FIG. 8.

Since the draw line 236 of each radial rib 180 is wrapped around pulley 250 of block 252, it can be appreciated that each sail segment 220 is shifted towards its closed position by drawing block 252 through the interior of axle 28 toward mounting frame upper section 32. Correspondingly, sail segments 220 can be adjustably opened by permitting block 252 to shift toward the free end portion 184 of axle 28 thus increasing the portion of draw line 236 which extends outwardly of the outer portion 210 of each radial rib 180. It can be appreciated that as long as some tension is maintained on drawlines 236, said drawlines impart a compressive load on its corresponding radial rib 180 thereby tending to maintain such rib in erect position at an orientation generally perpendicularly to the length of axle 28.

Again referring to FIG. 8, the clevise 256 of block 252 is connected to the free end 258 of line 260 through the use of an elastic ring 262. The end of line 260 opposite block 252 is spooled on a drum of any suitable electrically powered winch 266 which is mounted longitudinally of the end of axle 28 opposite hub 178. Electric winch 266 can be selectively actuated by a crew member to thereby wind or unwind its drum to in turn vary the location of block 252 along the length of axle 28 which in turn dictates the location of the open side edge 234 of each sail segment 220 relative to the closed side edge 224 of an adjacent sail segment.

In addition to functioning as a conventional sail, sail 24 also energizes an auxiliary propulsion system for boat 22. Basically, the rotation of sail 24 about axle 28, which occurs when sail segments 220 are askewed relative to the circular convex shape of support frame 25 to thereby react against the wind, is utilized to generate electricity to power an electric drive motor 284 which is mechanically coupled to a conventional propeller or screw 286. As illustrated in FIGS. 1 and 2, a large diameter first sheave 288 is securely engaged over the circumference of the portion of axle 28 which extends rearwardly of mounting frame upper section 32. A smaller diameter second sheave 290 is mounted on one end of jack shaft 292 which is aligned with first sheave 288. Jack shaft 292 is rotatably journaled on the lower portion of a mounting bracket 294, which mounting bracket 294 depends downwardly from the portion of plate 172 which overhands rearwardly of diagonal leg 170 of mounting frame upper section 32. First and second sheaves 288 and 290, are interconnected by belt 296 which rides in circumferential grooves provided in both of said two sheaves.

A third sheave 306 is mounted on the end portion of jack shaft 292 opposite second sheave 290, which third sheave is aligned with a fourth sheave 308 which is mounted on the free end of the input shaft of an electrical generator 312. Electric generator 312 is supported by mounting bracket 294 at an elevation above jack shaft 292. A second belt 322 interconnects third sheave 306 and fourth sheave 308, which second belt rides in a circumferentially located groove provided in said two sheaves.

Electricity produced by generator 312 is initially transmitted to batteries 324. A conventional brush and commutator assembly 325 is mounted to the underside of plate portion 130 of base member 128 and to the upper end of post 72 of mounting frame upper section 32 to enable electricity produced by generator 312 to reach batteries 324 irrespective of the relative angular orientation between mounting frame upper section 32 and lower section 34. Preferably batteries 324 are located in the lower sections of hull 20 to thereby also serve as a portion of the necessary ballast of boat 22.

When auxiliary power is required, the electricity stored in batteries 324 can be utilized to power electric motor 284 which in turn drives screw 286 through drive shaft 326.

It can be appreciated that utilizing rotating sail 24 to generate electricity which is used to power drive motor 284 eliminates the need for a conventional internal combustion engine to drive screw 286. It can be appreciated that electric motor 284 not only creates less vibration and noise than would a conventional internal combustion engine, but also is much more economical to operate and maintain than an internal combustion engine. Additionally, applicant's auxiliary drive system does not require gasoline or diesel fuel to be stored on boat 22 thereby eliminating the fire hazard and dangers associated therewith and also eliminating the necessity of complying with the structural and ventilation regulations which must be met when petroleum fuels are stored on a boat. Applicant's wind driven auxiliary power system also has the advantage of permitting boat 22 to cruise for long ranges without having to intermittently return to port to take on fuel for an internal combustion engine.

In addition to generating electricity while boat 22 is moored or anchored in stationary position, sail 24 may be used to generate electricity while boat 22 is on a running, reaching or even a tacking course. To accommodate the opposite directions in which sail 24 will rotate when on a starboard tack or reach as opposed to a port tack or reach, a conventional electrical rectifier can be incorporated into the above described electrical generating system, for example as a component of electrical generator 312.

The effectiveness of sail 24 as a power source for electric motor 284 can be modulated by varying the angle of attack of each sail segment 220 which alters the effective area of each sail segment 220 in the direction transverse to the circular convex form defined by radial ribs 180, which area reacts with the wind to cause sail 24 to rotate about axle 28. As the transverse effective area of each sail segment is increased, more sail area is available to react with the wind thereby dictating the speed at which sail 24 will rotate for a given wind speed. To achieve a sail rotational speed which is fast enough to generate electricity at a rate sufficient to recharge batteries within a reasonable length of time, sail segments 220 may have to be opened further in light winds than in heavy winds. Conversely, if a heavy wind is blowing, the same rotational speed of sail 24 can be achieved with sail segments 220 set almost at a closed position.

In use as a conventional sail, sail 24 can be pivoted about the vertical axis defined by post 72 and sleeve 78 to propel boat 22 in a desired direction for a given wind direction and speed. When in the orientation illustrated in FIGS. 1-3, sail 24 is rigged to run with the wind. To assume a starboard tacking course, when viewed looking downwardly onto boat 22, mounting frame upper section 32 is rotated relative to mounting frame lower section 34 in a counterclockwise direction from its orientation illustrated in FIGS. 1-3 so that sail 24 is thereby disposed on the port side of boat 22. Alternatively, to assume a port tacking course, mounting frame upper section 32 is rotated relative to lower section 34 in a clockwise direction from its orientation illustrated in FIGS. 1-3 to thereby disposed sail 24 on the starboard side of boat 22.

The effectiveness of sail 24 as a conventional sail can be altered by selectively adjusting the positions of sail segments 220. Sail 24 will operate most efficiently as a conventional sail when said sail 24 is in closed position wherein the open side edge 234 of each sail segment 220 is disposed closely adjacent of the closed side edge 224 of the adjacent sail segment 220 so that all sail segments 220 cooperate to form a generally closed, circular convex form having a maximum sail area. If it is desired to cruise at a slower than maximum speed, sail segments 220 can be opened a selective amount to permit the open side edge 230 of each sail segment to extend forwardly of the closed side edge 224 of the adjacent sail segment 220 thus reducing the effective area of sail 24. Permitting sail segments 220 to assume an open position, however, increases the angle of attack of said sail segments 220 thereby tending to increase the rotational speed of sail 4. If it is desired to decrease the rotational speed of sail 24 about axle 28, sail segments 220 can be further opened to assume an orientation beyond the position in which said sail segments function most efficiently in their role as the blades of a wind driven propeller. Alternatively, one or more sail segments 220 can be removed from support frame 25 by slidably unthreading bolt rope 220 from its corresponding bolt rope channel 226 thus reducing the effective area of sail 24. Hook 240 of draw line 236 of each removed sail segment 220 can be conveniently hooked on a ring 214 located at the outer end portion 210 of the radial rib 180 through which draw line 236 extends. In this manner, the draw line 236 still maintains a compressive load on its corresponding rib 180, as discussed above, thereby maintaining such radial rib in an erect position generally perpendicularly to axle 28.

When running on the auxiliary electrical energy stored in batteries 334, sail 24 can be collapsed and mounting frame 30 retracted to enhance the stability of boat 222 by reducing its vertical center of gravity, and also to eliminate the drag which would exist if sail 24 is left in erect position. To collapse sail 24, draw lines 236 are relaxed. This removes the compressive load imported on ribs 180 by draw line 236 which load maintains said ribs in the erect position shown in FIGS. 1-3. Mounting frame upper section 32 can then be pivoted in a counterclockwise direction as viewed in FIG. 2 about horizontally disposed capscrew 148 in the manner described above until axle 28 is in an upright position causing ribs 180 to pivot at their inner end portion 206 about cross pin 204 to thereby collapse said radial ribs 180. Thereafter, with capscrew 148 aligned transversely with the length of boat 22, mounting frame upper section 32, as viewed in FIG. 2, can be rotated clockwise approximately 270 degrees about such horizontally disposed capscrew 148 in the manner previously described to thereby tuck said upper section 32, along with portions of axle 28 and ribs 180 between the two laterally spaced apart leg structures 52. To maintain ribs 180 in collapsed position, their outer end portions 210 can be banded together by a rope or line, not shown. Also, it will be necessary to unhook the guy lines 212 which would interfere with leg structures 52. To erect sail 24, the above-described collapsing procedure is simply reversed.

At times it may be advantageous to pivot pivot sail 24 about horizontal capscrew 148 even when sail 24 is being used as a conventional sail. Rather than in the vertical attitude shown in FIGS. 1-3, sail 24 could be tilted about capscrew 148 into selective orientations to create an uplifting force on boat 22 when sail 24 reacts to the wind. As a consequence an uplifting force is imposed on boat 22 shich in turn reduces the wetted area of hull 20 so that the water imparts less drag on hull 20. Even when anchored, the mounting frame upper section 32 can be pivoted about capscrew 148 to a horizontal orientation so that sail 24 can conveniently serve as an umbrella to shade deck 124 from the sun.

What is claimed is:

1. In a wind driven dual propulsion system for a boat having a mounting frame extending upwardly from the hull of the boat and adapted to rotate about a first axis of rotation extending generally vertically from the boat, and a singular sail including a plurality of flexible sail segments disposed about a center, the improvement comprising:

an overhung, elongate axle journaled at one end to said mounting frame for rotation about a second axis of rotation extending longitudinally along the length of said axle; and a sail support frame including a central hub member mounted on the free end of said axle and a plurality of arcuate sail supporting ribs disposed about the circumference of said hub, each of said ribs having a straight inner end portion extending radially, normally outwardly from said hub and an outer end portion curving transversely to said inner end portion and lying substantially in a plane which also includes the longitudinal axis of said axle, to thereby collectively define a circular-convex shape for cooperatively supporting said sail segments in an overall circular-convex sail shape thereby enabling said sail to function in the manner of a conventional sail to propel the boat and also enabling the sails to rotate about the longitudinal axis of said axle to serve as an auxiliary propulsion source.

2. The improvement according to claim 1, further comprising means for hingedly attaching said radial ribs to said hub to enable each of said ribs to pivot between a collapsed, sail storing position wherein each of said radial ribs lies longitudinally alongside said axle, and an erect position wherein each of said ribs extends radially outwardly from said hub, said attaching means including pairs of spaced apart, elongate arms extending radially outwardly from said hub for receiving a corresponding radial rib therebetween, and pin means pinning the end portion of each of said radial ribs adjacent said hub to a corresponding pair of elongate arms.

3. The improvement according to claims 1 or 2, wherein said mounting frame includes a lower frame section attached to the boat, said lower frame section having a pair of laterally spaced apart leg structures defining an opening between them extending longitudinally along the length of the boat; an upper frame section rotatably supporting said axle; and, pivot means for selectively pivoting said mounting frame upper section relative to said mounting frame lower section about a third axis of rotation extending perpendicularly to both said first and second axis of rotation to shift said upper frame section between an upright position, wherein said mounting frame upper section is disposed above said mounting frame lower section, and a lowered position wherein:

said mounting frame upper section extends downwardly from said pivot means and is at least partially tucked between portions of said lower frame section leg structures, and wherein with said radial ribs in collapsed position, all of said ribs are disposed below the top of said lower frame structure and at least some of said radial ribs extend between said laterally spaced apart lower frame section leg structures to thereby significantly lower the vertical center of gravity of said sailing system relative to the center of gravity existing when said upper frame section is in upright position.

4. The improvement according to claim 3, wherein said pivot means for selectively pivoting said mounting frame upper section relative to said mounting frame lower section about said third axis of rotation comprises:

a pair of upright walls extending upwardly from said mounting frame lower section and disposed in spaced parallel relationship for receiving portions of said mounting frame upper section therebetween;

a pivot pin disposed along said third axis of rotation and supported by said two walls;

a first gear fixedly mounted on said mounting frame upper section, and a second gear fixed to and disposed between said two walls and meshed with said first gear, wherein said mounting frame upper section being pivotable relative to said mounting frame lower section about said pivot pin by selective rotation of said second gear.

* * * * *